US006996266B2

(12) United States Patent
Hamaguchi

(10) Patent No.: US 6,996,266 B2
(45) Date of Patent: Feb. 7, 2006

(54) METHOD AND APPARATUS FOR GENERATING THREE-DIMENSIONAL DATA OF AN OBJECT BY SELECTING THE METHOD FOR DETECTING CORRESPONDING POINTS THAT IS SUITABLE TO THE OBJECT

(75) Inventor: Takayuki Hamaguchi, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 839 days.

(21) Appl. No.: 09/925,742

(22) Filed: Aug. 10, 2001

(65) Prior Publication Data

US 2002/0018062 A1 Feb. 14, 2002

(30) Foreign Application Priority Data

Aug. 11, 2000 (JP) ............................. 2000-243860

(51) Int. Cl.
*G06K 9/00* (2006.01)
(52) U.S. Cl. ..................... 382/154; 345/419; 345/629; 348/42
(58) Field of Classification Search ................ 382/154, 382/278, 118; 345/419; 356/12–14
See application file for complete search history.

(56) References Cited

U.S. PATENT DOCUMENTS

| | | | | |
|---|---|---|---|---|
| 4,062,045 A | * | 12/1977 | Iwane ......................... | 348/48 |
| 5,179,441 A | * | 1/1993 | Anderson et al. ............. | 348/43 |
| 5,606,627 A | * | 2/1997 | Kuo ........................... | 382/154 |
| 6,064,775 A | * | 5/2000 | Suzuki et al. ................ | 382/254 |
| 6,181,815 B1 | * | 1/2001 | Marugame .................. | 382/154 |
| 6,215,899 B1 | * | 4/2001 | Morimura et al. ........... | 382/154 |
| 6,249,616 B1 | * | 6/2001 | Hashimoto .................. | 382/284 |
| 6,269,182 B1 | * | 7/2001 | Ishii ........................... | 382/165 |
| 6,389,169 B1 | * | 5/2002 | Stark et al. ................. | 382/225 |
| 6,434,265 B1 | * | 8/2002 | Xiong et al. ................ | 382/154 |
| 6,519,358 B1 | * | 2/2003 | Yokoyama et al. ......... | 382/154 |

(Continued)

FOREIGN PATENT DOCUMENTS

JP 07-103734 4/1995

(Continued)

OTHER PUBLICATIONS

Frédéric Devernay Olivier Faugeras, "Computing Differential Properties of 3-D Shapes from Stereoscopic Images without 3-D Models", Programme 4—Robotique, image et vision Projet Robotvis, Rapport de recherche n° 2304, Jul. 1994.*

*Primary Examiner*—Kanjibhai Patel
*Assistant Examiner*—Manav Seth
(74) *Attorney, Agent, or Firm*—McDermott Will & Emery LLP

(57) ABSTRACT

A three-dimensional data generating apparatus of the present invention comprises an obtaining portion for obtaining plural image data representing images obtained by photographing an object from different viewpoints, the plural image data each representing respective one of the images; a first detector for detecting corresponding points of the images by a gradient method; a second detector for detecting corresponding points of the images by a correlation method; a selector for selecting either one of the first detector or the second detector; and a generator for generating three-dimensional image of the object based on the corresponding points detect by the selected detector. The present invention is capable of generating highly reliable three-dimensional data irrelevant to a type of an object.

15 Claims, 18 Drawing Sheets

U.S. PATENT DOCUMENTS

| | | | |
|---|---|---|---|
| 6,580,810 B1 * | 6/2003 | Yang et al. | 382/103 |
| 6,580,821 B1 * | 6/2003 | Roy | 382/154 |
| 6,606,406 B1 * | 8/2003 | Zhang et al. | 382/154 |
| 6,608,927 B2 * | 8/2003 | Ohta | 382/167 |
| 6,611,622 B1 * | 8/2003 | Krumm | 382/170 |
| 6,621,921 B1 * | 9/2003 | Matsugu et al. | 382/154 |
| 6,674,902 B1 * | 1/2004 | Kondo et al. | 382/199 |
| 6,788,809 B1 * | 9/2004 | Grzeszczuk et al. | 382/154 |

FOREIGN PATENT DOCUMENTS

| | | |
|---|---|---|
| JP | 07-105382 | 4/1995 |
| JP | 09-044677 | 2/1997 |
| JP | 2000-092454 | 3/2000 |
| JP | 2000-172741 | 6/2000 |
| JP | 2000-339473 | 12/2000 |

* cited by examiner

FIG. 3
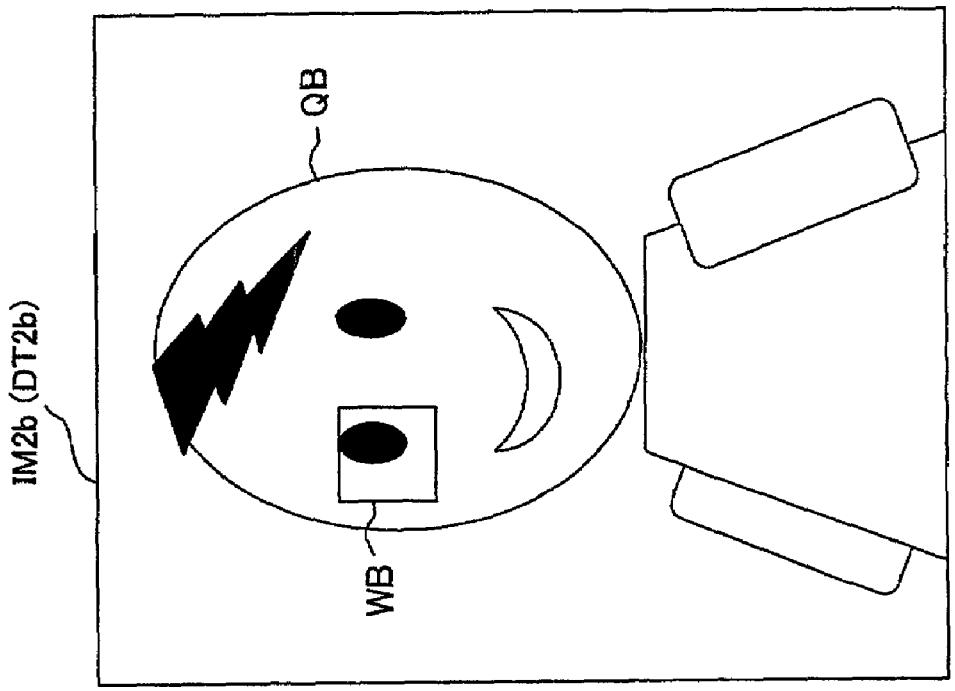
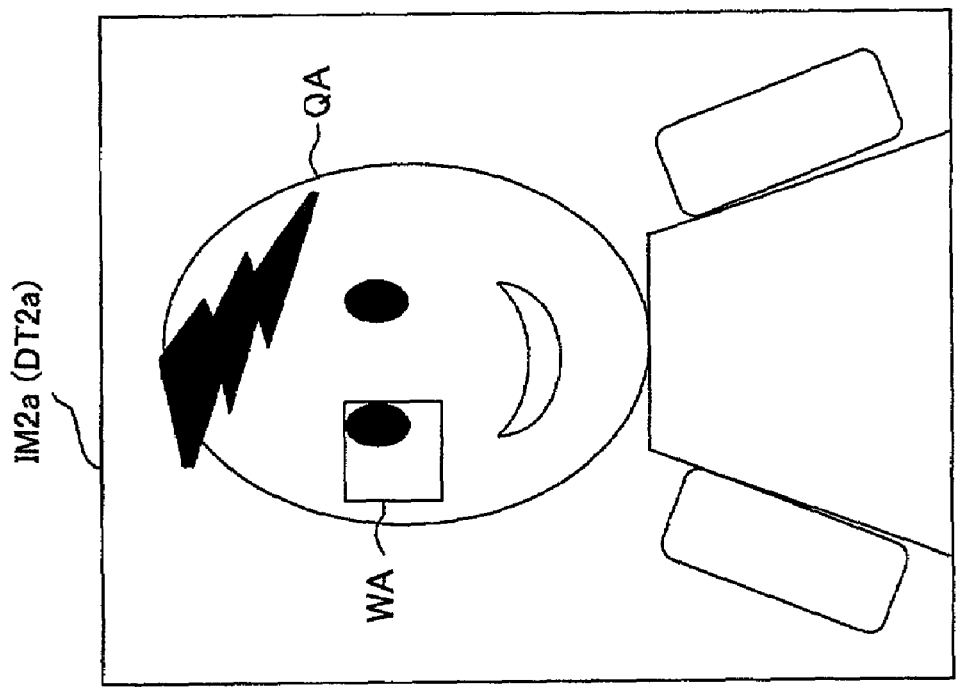

METHOD AND APPARATUS FOR GENERATING THREE-DIMENSIONAL DATA OF AN OBJECT BY SELECTING THE METHOD FOR DETECTING CORRESPONDING POINTS THAT IS SUITABLE TO THE OBJECT

This applicatoin is based on Japanese Patent Application No. 2000-243860 filed on Aug. 11, 2000, the contents of which are hereby incorporated by reference.

BACKGROUND OF THE INVENTION

1. Field of the Invention

The present invention relates to a method and an apparatus for generating three-dimensional data by detecting corresponding points of two two-dimensional images whose contents are similar to each other such as two two-dimensional images captured stereographically with respect to an object using a gradient method, a correlation method or the like.

2. Description of the Prior Art

Conventionally, there are known techniques for generating three-dimensional data from plural two-dimensional image data (a two-dimensional image is hereinafter referred to as an "image" and two-dimensional image data are referred to as "image data" in the present specification) as of an object captured by, for example, using a plurality of cameras. In generating the three-dimensional data, it is necessary to detect to which point of an image an arbitrary point of another image corresponds to, i.e. to detect corresponding points of the images. The correlation method is the most popular method for detecting such corresponding points.

By the correlation method, the corresponding points are detected by setting an image as a standard image and finding an area similar to the standard image from another image. For example, the corresponding points are detected in such a manner by extracting a small area of the standard image as a standard window and detecting, in another image, a window having luminance of points similar to those of points of the standard window. The correlation method has other applications such as a method for detecting the corresponding points by a correlation of luminance on an epipolar line, a method wherein the size of a window is changed and a method wherein a correlation is detected by binarization of an image.

Another known method for detecting the corresponding points is the gradient method. In the gradient method, the corresponding points are detected from luminance gradient of an area adjacent to a point whose coordinate is in common to plural images similar to each other.

The correlation method is superior in detecting corresponding points of an object whose luminance or color gradation is widely varying on its surface. However, any of the above methods are not fully satisfactory for the detection of the corresponding points of an object that is poor in luminance change or an object that is low in contrast. Therefore, the correlation method is not suitable for generating three-dimensional data of a face of a human or the like.

In turn, the gradient method requires shorter calculation time as compared with the correlation method and is superior in detecting the corresponding points in the case of low luminance and low contrast. Further, the gradient method can detect the corresponding points correctly by using subpixels if the object is in an ideal state. However, the gradient method is not competent to differences in luminance or color gradation or CCD noise and has a drawback that an erroneous detection of the corresponding points occurs when there is an occlusion. Therefore, the gradient method is not suitable for generating three-dimensional data of products having a spherical or cylindrical shape, products made from a metal or glass and so on.

SUMMARY OF THE INVENTION

An object of the present invention is to generate highly reliable three-dimensional data of any types of objects such as a human face, an industrial product and so on.

The three-dimensional data generating apparatus according to the present invention comprises: an obtaining portion for obtaining plural image data representing images obtained by photographing an object from different viewpoints, the plural image data each representing respective one of the images; a first detector for detecting a corresponding point in each of the images by the gradient method; a second detector for detecting a corresponding point in each of the images by the correlation method; a selector for selecting either one of the first detector or the second detector; and a generator for generating three-dimensional image of the object based on the corresponding point detect by the selected detector.

Preferably, the apparatus may comprise an object judging portion for judging a type of an object, and the selector may select either one of the first detector or the second detector based on a judgment result obtained by the object judging portion.

The obtaining portion may be comprised in the apparatus separately from other portions or integrally with other portions.

BRIEF DESCRIPTION OF THE DRAWINGS

FIG. 3 is an example of two images.

DESCRIPTION OF THE PREFERRED EMBODIMENTS (First Embodiment)

In the first embodiment, colors of an object are detected to select a detector for generating three-dimensional data.

Figure 1:
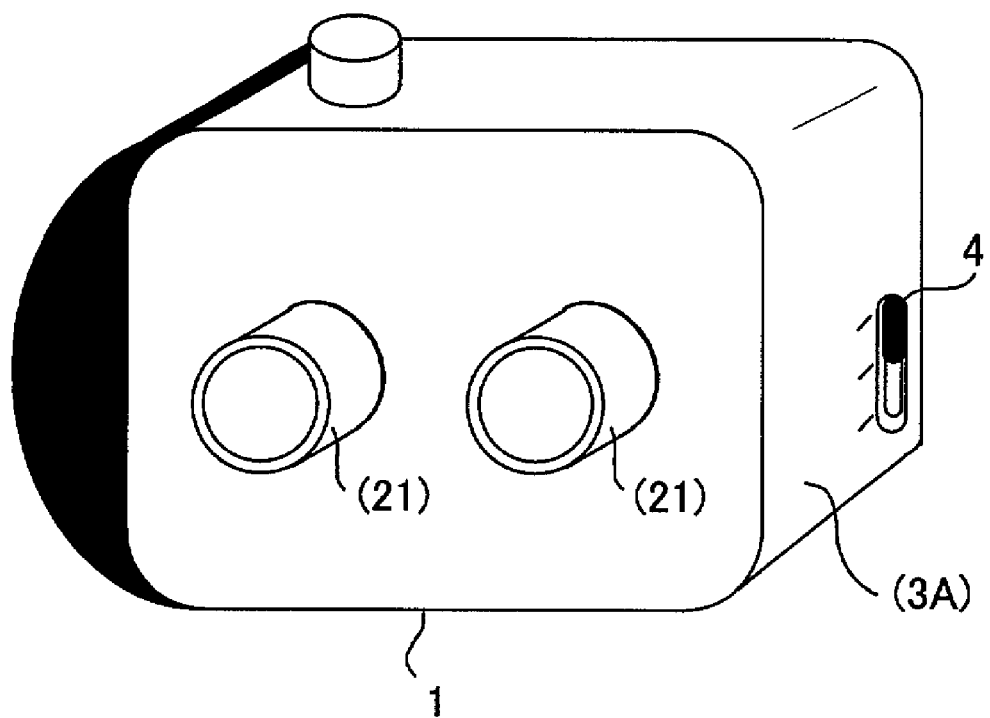
FIG. 1 shows an appearance of a three-dimensional image generating apparatus according to a first embodiment of the present invention.
Figure 2:
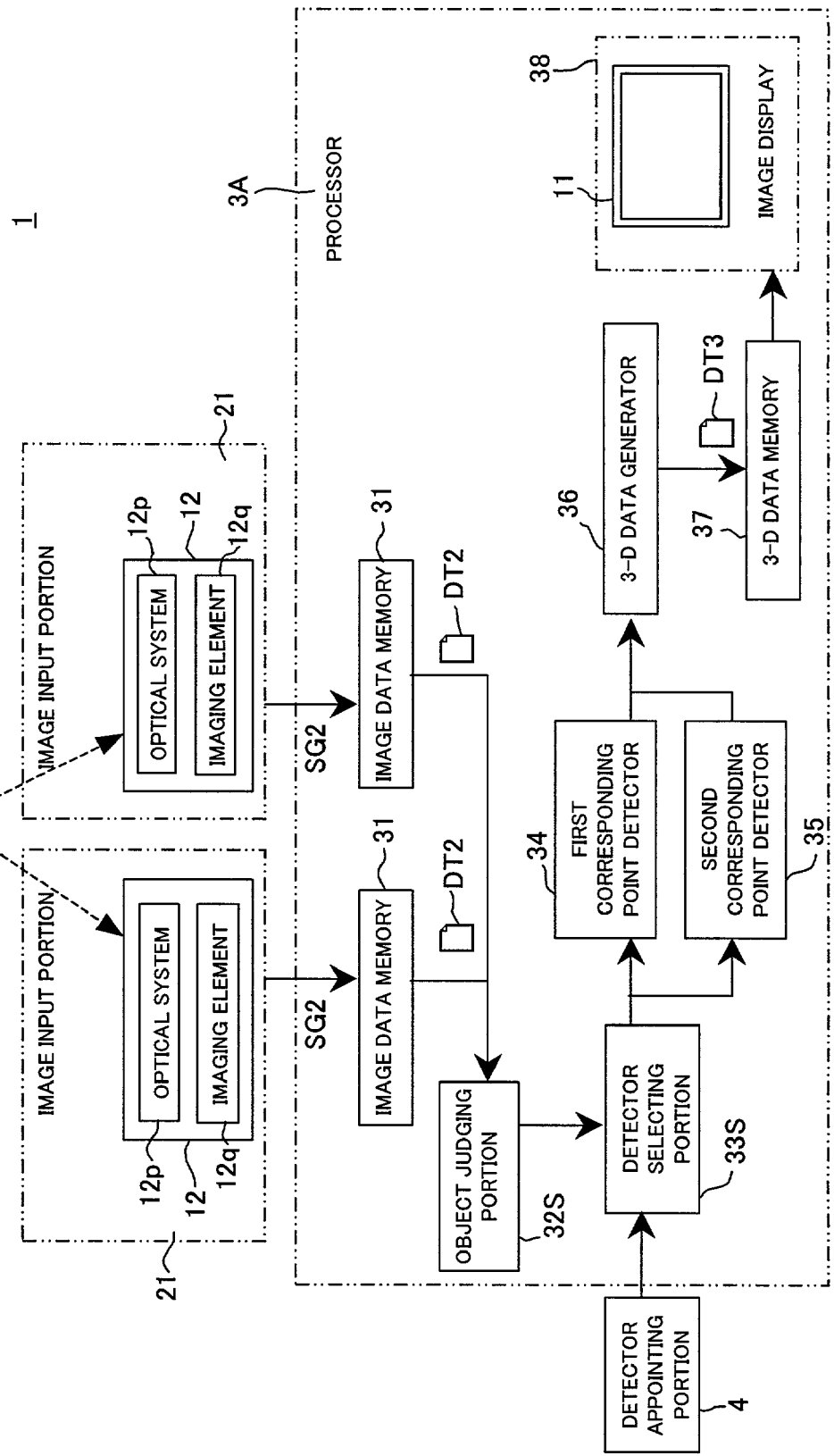
FIG. 2 is a block diagram showing a structure of the three-dimensional data generating apparatus according to the first embodiment.

FIG. 1 shows an appearance of the three-dimensional data generating apparatus 1 according to the first embodiment. FIG. 2 is a block diagram showing a structure of the three-dimensional data generating apparatus 1 according to the first embodiment.

As shown in FIGS. 1 and 2, the three-dimensional data generating apparatus 1 comprises two image input portions 21, processor 3A and a detector appointing portion 4.

Referring to FIG. 2, the image input portions 21 each comprises an optical system 12$p$, an imaging element 12$q$, a camera 12 including a control circuit not shown and so on. The image input portions 21 serves to generate image data. The optical system 12$p$ comprises various lenses, a diaphragm and so on and serves to form an image on the imaging element 12$q$ by receiving light from an object Q. The imaging element 12$q$ converts the image of the object Q into an electric signal. As the imaging element 12$q$, there may be used a CCD type solid-state imaging element and the like. The image signal generated by the imaging element 12$q$ is converted into a digital signal by an A/D converter so as to be image data.

The detector appointing portion 4 is a sliding switch for appointing either one of detectors to be described later in this specification in accordance with manual operation of a user. This sliding switch can be switched among 3 modes of "portrait", "auto" and "landscape".

The processor 3A comprises various devices such as a display 11, an input device, a CPU, a RAM, a ROM, a control circuit, software such as a control program and the like. By above devices and so on, there can be realized functions of two image data memories 31, an object judging portion 32S, a detector selecting portion 33S, a first corresponding point detector 34, a second corresponding point detector 35, a three-dimensional data generator 36, a three-dimensional data memory 37, an image display 38 and so on.

The image data memories 31 each memorize the image data generated by the image input portion.

The object judging portion 32S judges a type of the object Q by detecting colors of the object Q and examining whether or not the object Q comprises a predetermined color in a predetermined amount.

Amounts of colors to be comprised in the object Q are decided by determining an average of color information of pixels comprised in the image data obtained by the image input portions 21. Characteristics of the object Q appear in the vicinity of center of an image and, therefore, only the amounts of colors in the vicinity of the center of the object Q may be calculated for the judgment of the type of the object Q. In order to judge a type of the object Q, the image data may be low in resolution since they are used only for the detection of colors and the calculation of the amounts of colors. The color information is typically obtained by a color equation c(C) of the following expression (1):

$$c(C)=r(R)+g(G)+b(B) \quad (1):$$

Here, r(R), g(G), b(B) each is a function representing an amount of each of three primitive colors of light: red, green and blue. When r(R), g(G) and b(B) each has 8 bits, an integer from 0 to 255 is assigned to each of R, G and B that are parameters for the function. The functions r(R), g(G) and b(B) are increased in an amount of red, green and blue, respectively, in proportion to the parameters R, G and B. When R=0, G=0 and B=0, c(C) is black. When R=255, G=255 and B=255, c(C) is white.

In the case of judging whether or not the object is a human, it is judged whether or not an area in the image data such as c(C) of each pixels in the vicinity of the center of the image corresponds to a specific color. It is judged that the object is a human when c(C) is a color of seasan in the present embodiment since the present embodiment is designed for a xanthoderm. Conditions under which c(C) be seasan are R≈250, G≈240 and B≈150. These values or areas specified by the values can be varied depending on the photographing conditions when so required. In addition, other colors may be set as c(C) instead of seasan depending on the race of human. Plural colors may be set as c(C) on the condition of logical OR so that plural races may be recognized as human.

In the case where the "auto" is selected in the detector appointing portion 4, the detector selecting portion 33S selects, based on the result obtained from the judgment by the object judging portion 32S, either one of the first corresponding point detector 34 which employs the gradient method or the second corresponding point detector 35 which employs the correlation method for the detection of corresponding points. For example, in the case where the object Q is a human, the first corresponding point detector 34 is selected; in the case where the object Q is not a human, the second corresponding point detector 35 is selected.

In the case where the "portrait" or the "landscape" is selected in the detector appointing portion 4, the object judging portion 32S does not perform the judgment processing. In this case, the detector selecting portion 33S operates in such a manner that the first corresponding point detector 34 is selected if the "portrait" is selected and the second corresponding point detector 35 is selected if the "landscape" is selected.

The first corresponding point detector 34 detects corresponding points of plural image data DT2 by the gradient method. The second corresponding point detector 35 detects corresponding points of plural image data DT2 by the correlation method. Descriptions on the detectors will be given later in this specification.

The three-dimensional data generator 36 generates three-dimensional data DT3 based on the detection result obtained by either one of the first corresponding point detector 34 or the second corresponding point detector 35. More specifically, the three-dimensional data DT3 are generated by reproducing three-dimensional image of the object based on the corresponding points of the plural image data DT2. The three-dimensional data memory 37 memorizes the three-dimensional data DT3.

The image display 38 displays a three-dimensional image on the display 11 based on the three-dimensional data DT3. A liquid crystal display or the like can be used as the display 11.

The detection of the corresponding points by the gradient method in the first corresponding point detector 34 will be described below.

Figure 4:
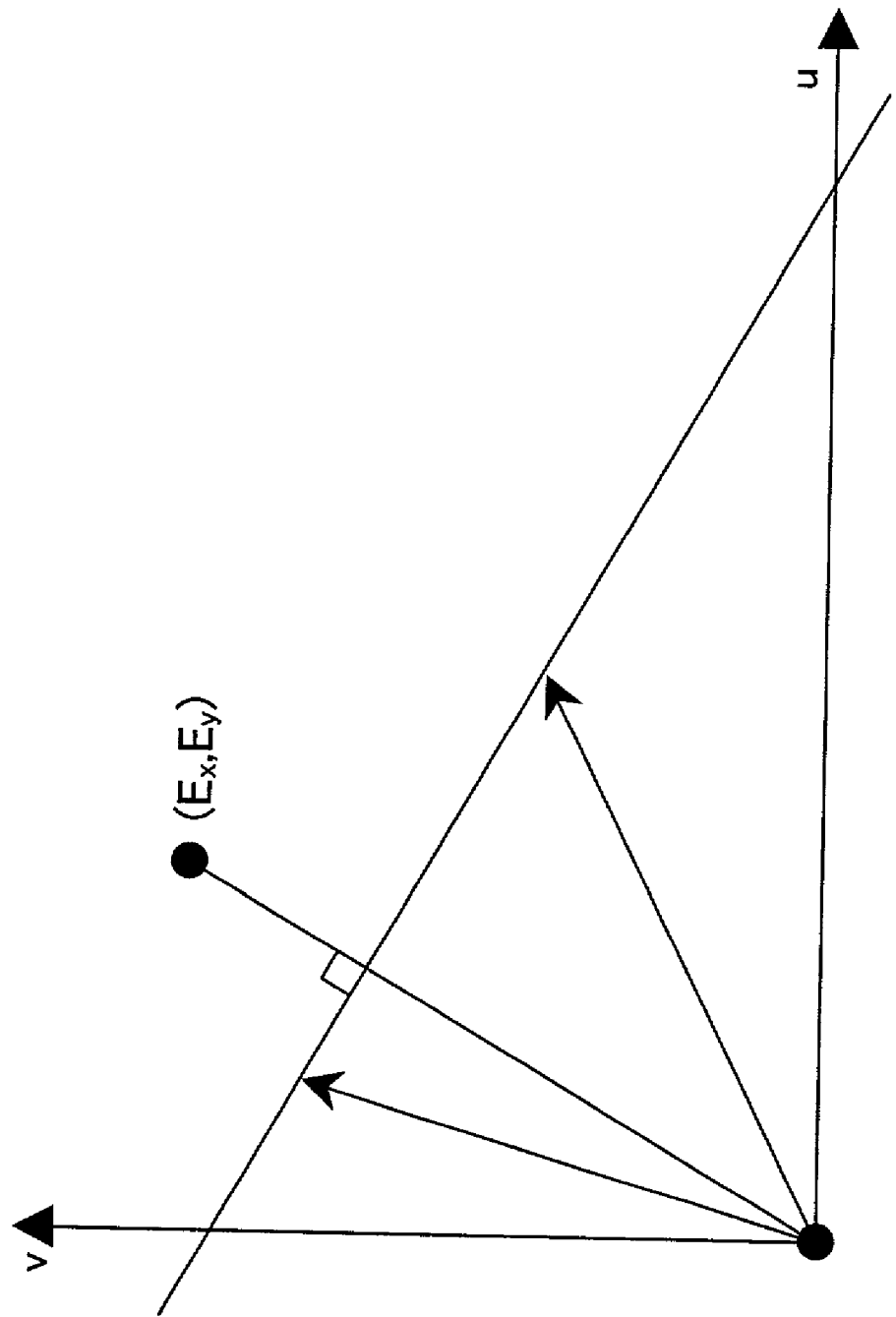
FIG. 4 is a graph showing an expression of a luminance gradient.
Figure 5:
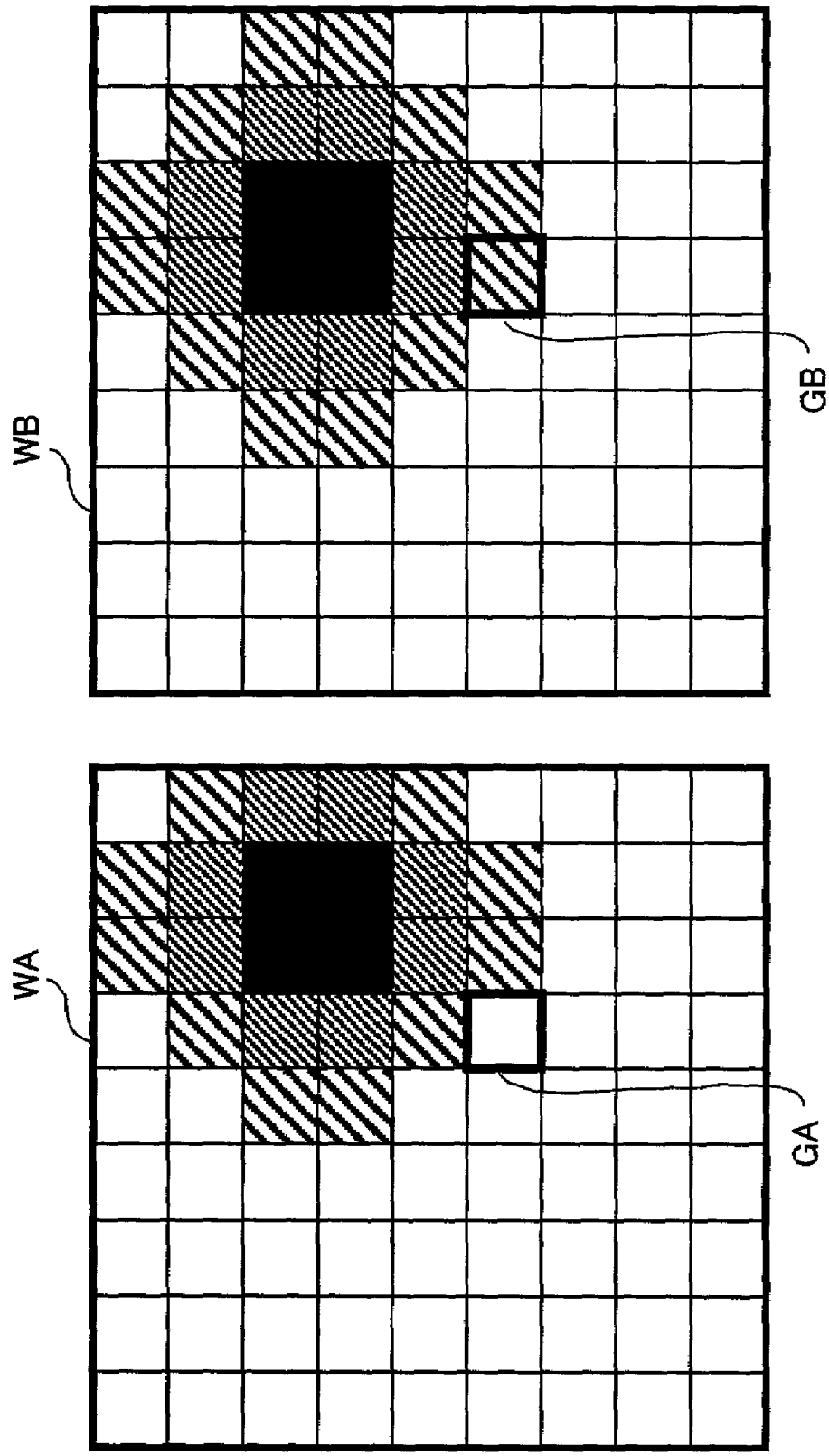
FIG. 5 is an enlarged view of windows WA and WB.
Figure 6:
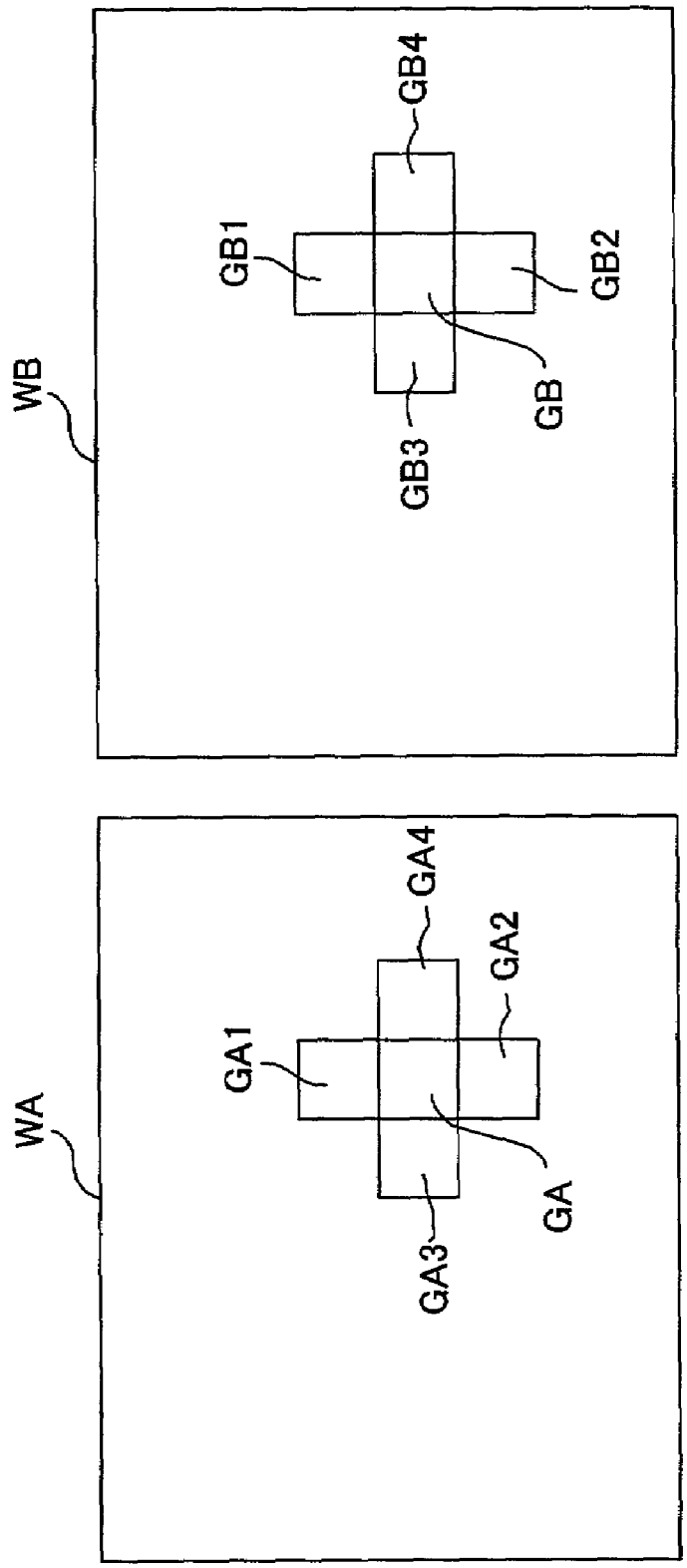
FIG. 6 shows a noted pixels GA and GB as well as pixels in the vicinity of the noted pixels.
Figure 7:
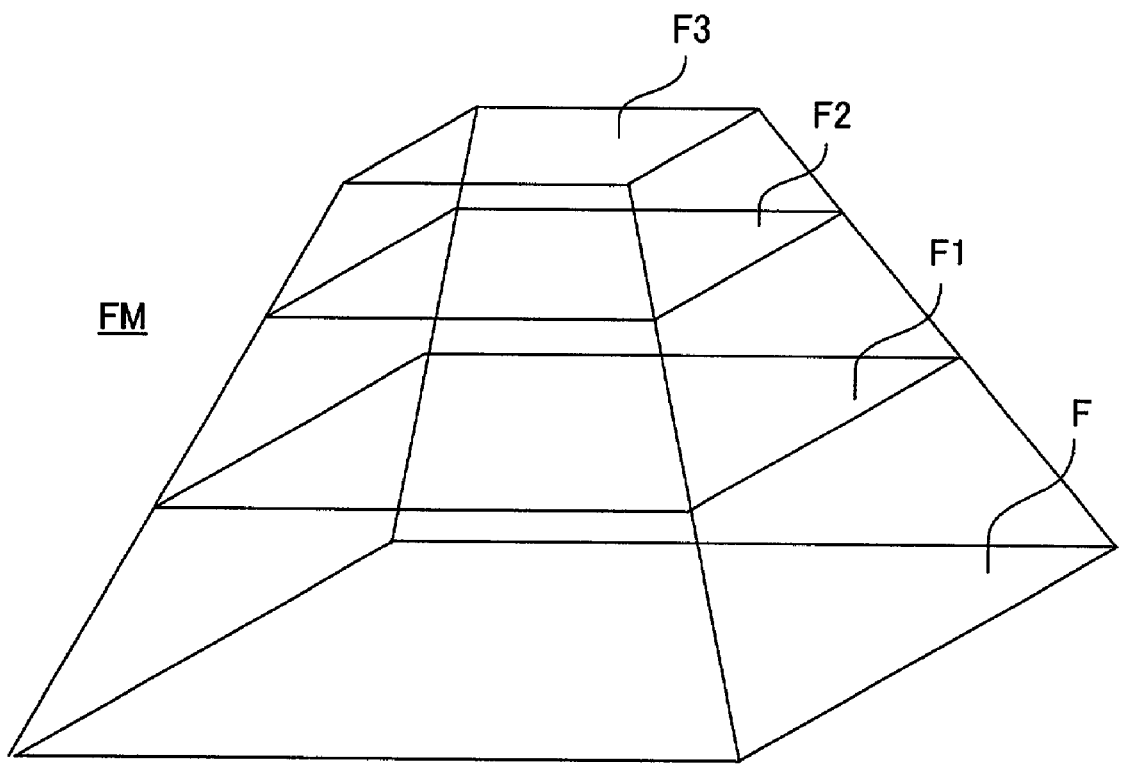
FIG. 7 illustrates a method wherein a multiple resolution image is used by way of an example.

FIG. 3 is an example of plural image IM2; FIG. 4 is a graph showing an expression of luminance gradient; FIG. 5 is an enlarged view of windows WA and WB; FIG. 6 shows noted pixels GA and GB as well as pixels in the vicinity of the noted pixels; and FIG. 7 illustrates an example of the method wherein a multiple resolution image is used.

Images IM2*a* and IM2*b* are images that are represented by each of the plural image data DT2*a* and DT2*b*. The image data DT2*a* and DT2*b* are data generated by separate image input portions 21. The image IM2*b* represents a standard image and the image IM2*a* represents a reference image. The images IM2*a* and IM2*b* respectively include the object image QA and QB of the object Q. The windows WA and WB are set in each of the images IM2*a* and IM2*b*. The window WB is a standard window set in the standard image, and the window WA is a reference window set in the reference image. Here, the windows WA and WB are at a position that includes right eye of the object.

Referring to FIG. 5, each of the windows WA and WB is comprised of 9×9 pixels.

The windows each may be comprised of 3×3 pixels, 5×5 pixels, 7×7 pixels or other numbers of pixels. The noted pixels GA and GB respectively are pixels on coordinates that are in common with the windows WA and WB. As shown in FIG. 6, pixels neighboring to the pixel GA in vertical and horizontal directions respectively are defined as GA1, GA2, GA3 and GA4. The same applies to the pixel GB, and the pixel GB is adjacent to pixels GB1, GB2, GB3 and GB4.

Purpose for detecting the corresponding points is to find on the reference image points corresponding to all of points on the object image QB of the object Q in the standard image. Vector connecting the corresponding points when the reference image and the standard image are superimposed is referred to as a "corresponding vector" in this specification, and the detection of corresponding points using the gradient method means the detection of corresponding vector (u, v) with respect to points on an image. The corresponding vector has a point of the standard image as its base point and has a point on the reference image as its end point.

More specifically, the corresponding vector represents difference between the images of the windows WB and WA and has relationship indicated by the following expression (2).

$$dE/dt = Exu + Eyv + Et = 0 \quad (2).$$

In the expression (2), Ex=δE/δx, Ey=δE/δy, u=δx/δt; v=δy/δt; Et=δE/δt; E represents luminance; x represents a coordinate in horizontal direction of an image; y represents a coordinate in vertical direction; and t represents time. Note that, since the images dealt with in the present embodiments are stereographical images, t corresponds to a distance between two cameras 12.

Since the object images QA and QB of FIG. 3 are prepared by photographing almost the same portion of the object Q, it is possible to assume that the luminance gradient of a point on a coordinate of the object image QA is the same as that of a point on the same coordinate of the object image QB.

Since the expression (2) contains two unknown letters u and v while containing only one equation, it can represent nothing more than that corresponding vectors are on a linear line as shown in FIG. 4. Therefore, another restraining condition is required between u and v in order to determine the corresponding vectors. Thus, there is made such an assumption that u and v are common to all the pixels in a certain area, for example, in an area of 3×3 pixels. Solution for u and v with respect to all the pixels are obtainable by solving, by the least square method, a simultaneous equation that is made by adding the restraining condition to the expression (2). It is possible to reduce influence of quantization error in imaging or noise of imaging element by using a wider area such as 5×5 pixels and 6×6 pixels.

If the corresponding vectors with respect to all the pixels are the same, there can be prepared 81 types of the expression (2). The corresponding vectors are obtainable by solving the expressions by using the least square method.

For example, Ex, Ey and Et of the expression (2) with respect to the pixels GA and GB can be represented by the following expressions (4) to (6).

$$Ex = \{([GA1]-[GA2]) + ([GB1]-[GB2])\}/2 \quad (4)$$

$$Ey = \{([GA3]-[GA4]) + ([GB3]-[GB4])\}/2 \quad (5)$$

$$Et = [GB] - [GA] \quad (6)$$

In above expressions, the reference characters such as [GA1] respectively represent luminance values of the pixels shown in FIG. 6. For example, [GA1] represents the luminance value of the pixel GA1 shown in FIG. 6.

Ex, Ey and Et with respect to other pixels are obtained in the same manner.

However, if the corresponding vectors are obtained by above method, difference of images of only a few pixels can be precisely measured. More specifically, in the case where the corresponding points are different to each other by more than a several pixels due to a relatively large parallax, it is impossible to obtain a precise corresponding point. This is a constraint imposed by a premise of the gradient method and, therefore, the reference image and the standard image must be similar to each other in order to obtain the corresponding point.

In the case where the corresponding points are distant from each other, the multi resolution image is utilized in order to detect the corresponding points precisely. The method using the multi resolution image it self is known in the art.

As shown in FIG. 7, the multiple resolution image FM comprises an original image F and a plurality of types of images F1, F2 and F3 obtained by so compressing the original image F as to be $(1/2)^2$, $(1/4)^2$, $(1/8)^2$ or the like that are low in resolution. An image that is relatively low in resolution typically has smaller number of pixels than that of an image that is high in resolution. Therefore, pyramid shape is formed by arranging an image that is the highest in resolution at the bottom and other images in the descending order of resolution. Thus, the multiple resolution image FM forms an image pyramid.

By the use of the multiple resolution image FM, two positions distant to each other between images IM2*a* and IM2*b* when the resolution is high, i.e., when there is a large number of pixels, approaches to each other when there is a small number of pixels. Accordingly, it is possible to widen an area wherein the corresponding points are precisely obtained by the gradient method as a result of transmitting the difference of images from a low resolution to a high resolution.

In the case of using the multiple resolution image as mentioned above, the corresponding vector is obtained with respect to the lowest resolution image to be set as an initial value. Then, another corresponding vector is obtained with respect to the second lowest resolution image. By repeating above processing, corresponding vectors high in resolution are obtainable if points on the images IM2a and IM2b that represents the same point on the object Q are largely different to each other.

The detection of corresponding points by using the second corresponding point detector 35 is described below.

Figure 8:
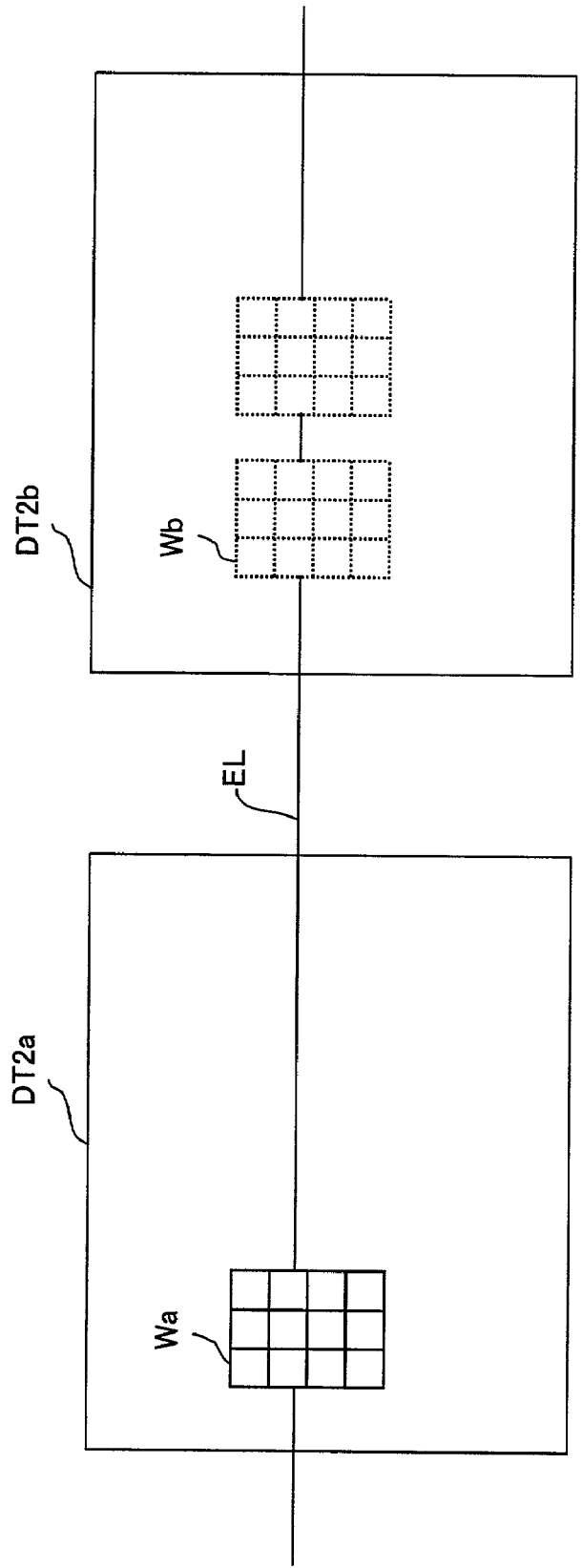
FIG. 8 shows a concept of detection using an epipolar line EL.
Figure 9:
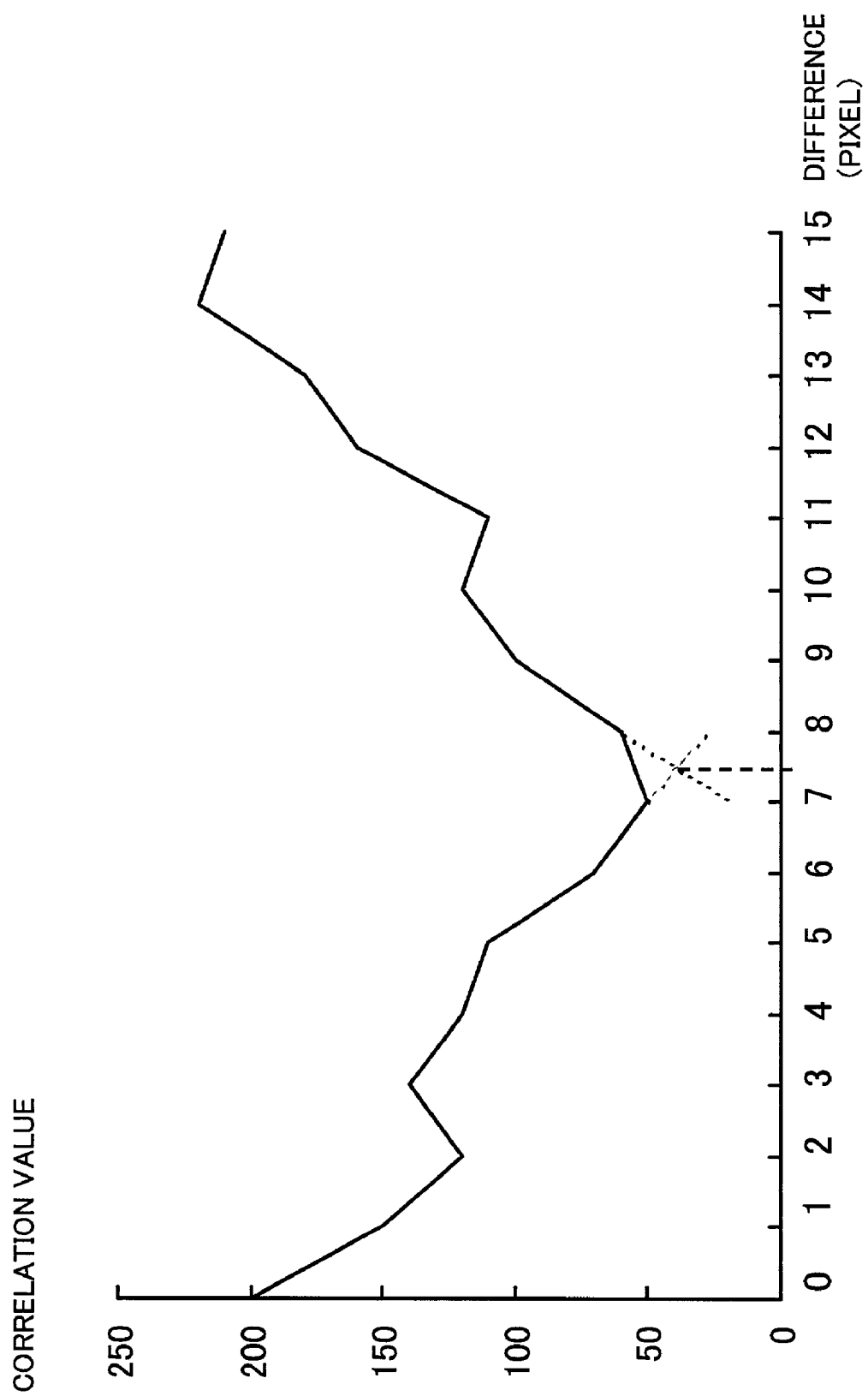
FIG. 9 illustrates a relationship between a correlation value and difference.

FIG. 8 shows a concept of detection using an epipolar line EL. FIG. 9 illustrates a relationship between a correlation value and difference.

The correlation method is a method for detecting windows that are high in correlation and is useful for calculating correlation between windows of two images.

In the calculation of correlation, a window that is the lowest in the correlation value is detected first. The correlation value is obtainable by adding differences between corresponding points of the windows. In the case of stereographical view, it is geometrically obvious that the corresponding windows are on the epipolar line and, therefore, the detection is conducted solely with respect to the epipolar line.

In FIG. 8, the window Wa is moved in the image IM2a from left upper end to right bottom end, and a window Wb corresponding the window Wa is detected from the image IM2b at each of the positions. The window Wb in the image IM2b is shifted by one pixel from the same coordinate as that of the image IM2a. Here, the correlation value of the windows Wa and Wb is calculated to detect a position which is the lowest in the correlation value. The difference obtained hereby is then obtained with respect to all the points moved in the image IM2a to form a map of differences. The differences correspond to parallax in the case of the stereographical view and thus called "parallax map".

In FIG. 9, the difference is used to enter the horizontal axis and the correlation value is used to enter the vertical axis. In the graph plotted by solid line, the correlation value is the lowest when the difference is detected with respect to seven pixels. Accordingly, it is understood from the graph that a window that is seven pixels off from the noted window is the most correlative to the noted window. Parallax obtained by above calculation is seven pixels.

Thus, parallax is obtainable with respect to pixels in the correlation method. However, the parallax does not always correspond to number of pixels. In order to obtain parallax with respect to subpixels by the correlation method, the graph of solid line is interpolated. One of the methods for the interpolation is a method wherein four points close to the lowest correlation value are noted and a point of intersection of lines formed by connecting each two points of the four points is set as the lowest correlation value.

By using above interpolation method, the parallax corresponds to 7.3 pixels as shown by the broken line in FIG. 9.

Generation of three-dimensional data DT3 according to the first embodiment will be described below with reference to a flowchart.

Figure 10:
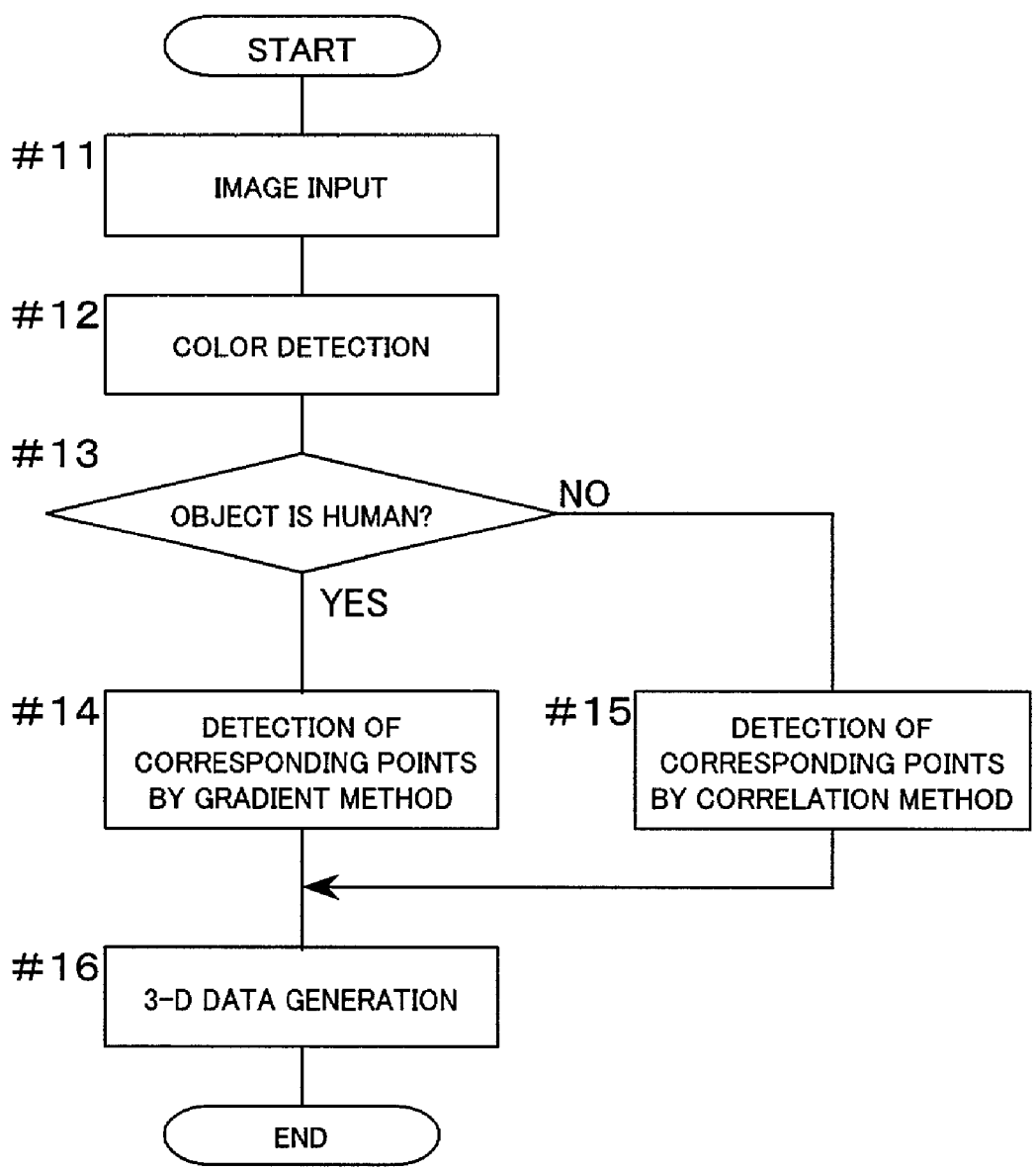
FIG. 10 is a flowchart showing a flow of the generation of three-dimensional data according to the first embodiment.

FIG. 10 is the flowchart showing a flow of the generation of three-dimensional data DT3 according to the first embodiment.

As shown in FIG. 10, two sets of image data DT2 are obtained by the two image input portions 21 (#11). The camera 12 used for photographing the object Q is subjected to calibration in advance of the photographing in order to grasp camera parameters such as projection matrix and lens aberration. In the case of photographing a moving object, the object is shoot in succession by monocular vision using one camera.

Amounts of colors of the object Q are detected based on the obtained image data DT2 (#12) to judge whether or not the object is a human (#13).

If it is judged that the object Q is a human, a corresponding point of the image data DT2a and DT2b is detected by the first corresponding point detector 34, i.e. by the gradient method (#14). If it is not judged that the object Q is a human, the corresponding point of the image data DT2a and DT2b is detected by the second corresponding point detector 35, i.e. by the correlation method (#15).

Then, three-dimensional data DT3 are generated based on either of the detection results of the step 14 or the step 15 (#16).

As described above, it is possible to generate highly reliable three-dimensional data by judging types of the object by detecting its colors, followed by selecting a detector, or a detection method, for detecting a corresponding point based on the judgment result.

In addition, it is possible to judge whether or not the object is a human based on any colors. Further, if the color r(R) solely is extracted from pixels of the object Q. characteristics of eyes, nose, forehead or cheeks are represented by red color gradation. It is possible to judge whether or not the object Q is a human by the red color gradation. The judgment may be made based on other various information such as infrared rays that radiates from the object by other various methods.

(Second Embodiment)

In the first embodiment, the selection of detector for generating the three-dimensional data is performed by detecting colors of the object. In turn, the selection is performed by calculating luminance gradient in the second embodiment.

Figure 11:
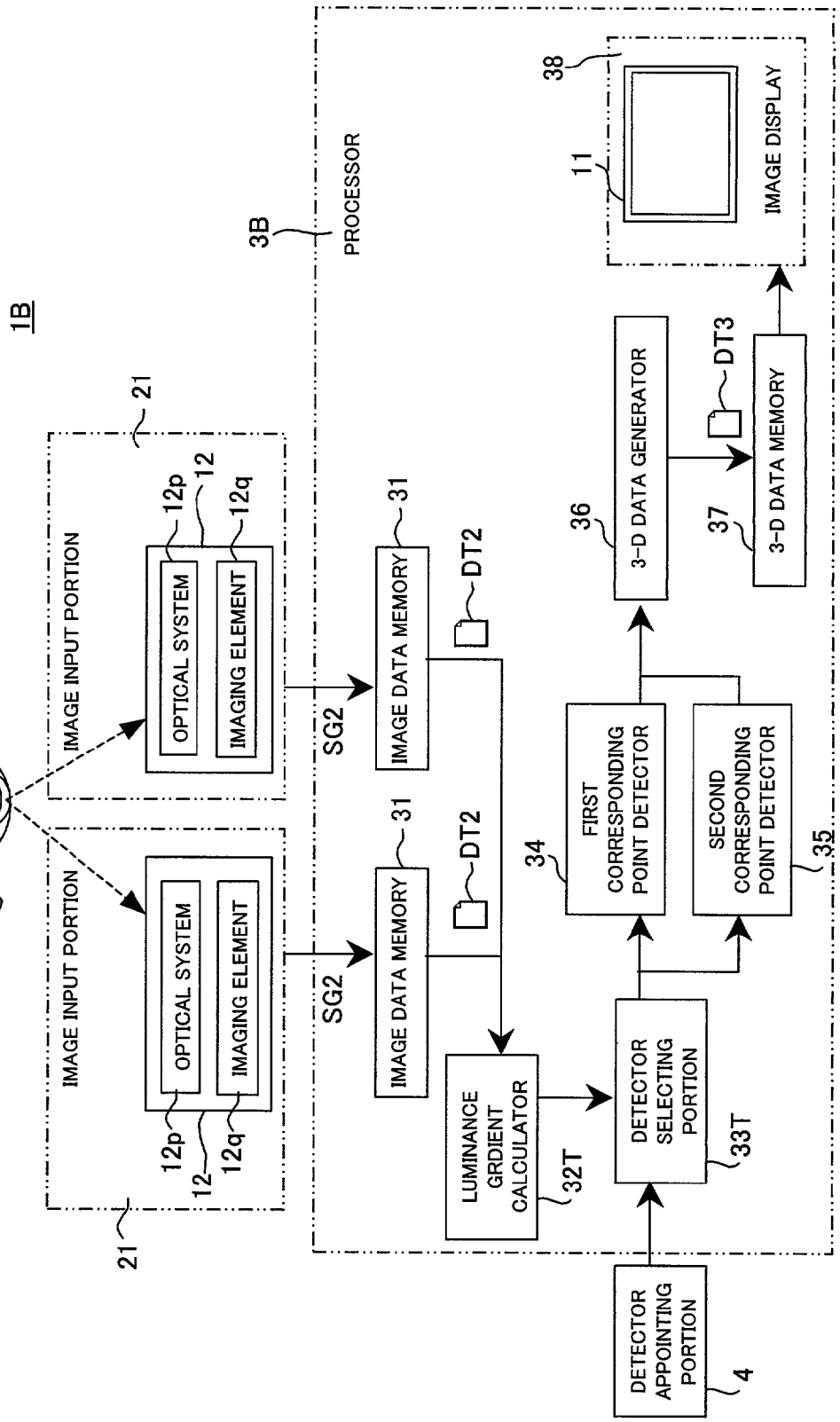
FIG. 11 is a block diagram showing a three-dimensional data generating apparatus according to a second embodiment of the present invention.

FIG. 11 is a block diagram showing a three-dimensional data generating device 1B according to the second embodiment of the present invention.

As shown in FIG. 11, the three-dimensional data generating apparatus 1B comprises two image input portions 21 and a processor 3B. The image input devices are the same as those of the first embodiment.

The processor 3B of the second embodiment comprises a luminance gradient calculator 32T and a detector selecting portion 33T unlike the processor 3A of the first embodiment. The two image data memories 31, the first corresponding detector 34, the second corresponding point detector 35, the three-dimensional data generator 36, the three-dimensional data memory 37 and the image display 38 are the same as those of the first embodiment. Operation processing is carried out in the luminance gradient calculator 32T only when the "auto" is appointed by the detector appointing portion 4, and the detector selecting portion 33T executes the selection based on the calculation results in the same manner as the first embodiment. In the case where the "portrait" or the "landscape" is appointed by the detector appointing portion 4, the first corresponding point detector 34 or the second corresponding point detector 35 is selected based on the appointment in the same manner as the first embodiment.

The luminance gradient calculator 32T calculates a luminance gradient of an object based on image data DT2. A luminance gradient Ex in the horizontal direction is obtainable by the expression (4), and a luminance gradient in the vertical direction Ey is obtainable by the expression (5). The luminance gradients Ex and Ey are calculated with respect to a several points of the image data DT2, and the luminance gradient of the object is calculated by, for example, obtaining a mean luminance gradient of the points. Two sets of image data DT2 used in the expressions (4) and (5) are obtained by photographing almost the same part and, therefore, it is possible to use only one of them for the calculation.

The detector selecting portion 33T selects either one of the first corresponding pint detector 34 or the second corresponding point detector 35 based on the judgment result obtained by the luminance gradient calculator 32T. The luminance gradient calculator 32T performs the selection in such a manner that the first corresponding point detector 34 is selected when the luminance gradient is lower than a predetermined value while the second corresponding point detector 35 is selected when the luminance gradient is higher than the predetermined value.

Processing for generating three-dimensional data according to the second embodiment will be described below with reference to a flowchart.

Figure 12:
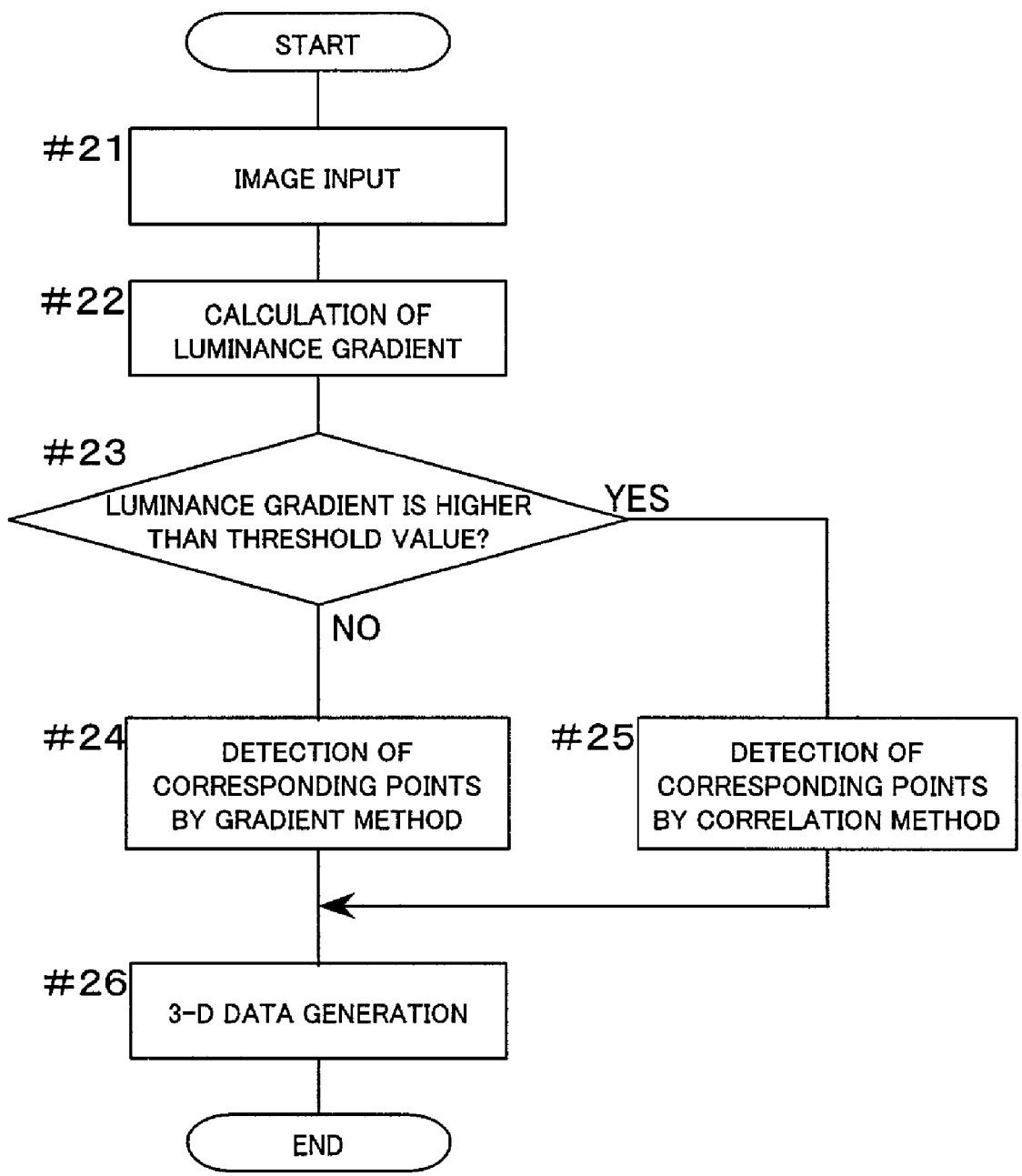
FIG. 12 is a flowchart showing processing for generating three-dimensional data according to the second embodiment.

FIG. 12 is the flowchart showing the processing for generating three-dimensional data according to the second embodiment.

As shown in FIG. 12, two sets of image data are obtained by two image input portions 21 in the same manner as the first embodiment (#21).

A luminance gradient of an object is calculated based on the obtained image data (#22), and it is judged whether or not a result of the calculation is higher than a predetermined value (#23).

In the case where the calculation result is higher than the predetermined value, a corresponding point of the two sets of image data is detected by using the second detector—35, i.e. by the correlation method (#24). In the case where the calculation result is lower than the predetermined value, the corresponding point of the two sets of image data is detected by the first detector—34, i.e. by the gradient method (#25).

Then, in the same manner as the first embodiment, three-dimensional data is generated based on the detection result (#26).

As described above, it is possible to generate the highly reliable three-dimensional data by calculating the luminance gradient of the object and selecting the detector for the corresponding point based on the calculation result according to the second embodiment.

(Third Embodiment)

In the first and second embodiments, generation of three-dimensional data is performed by using either one of the detectors. In turn, in the third embodiment, both of the detectors are used for the detection of corresponding point and the generation of three-dimensional data is performed by using detection result of higher reliability.

Figure 13:
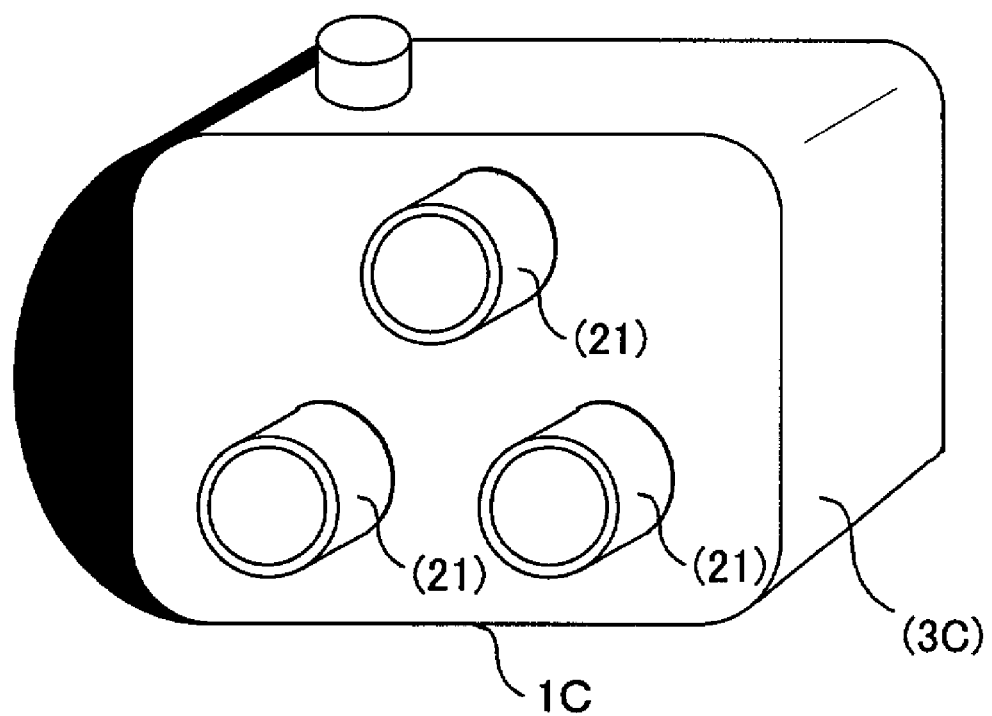
FIG. 13 shows an appearance of a three-dimensional data generating apparatus 1C according to the present invention.
Figure 14:
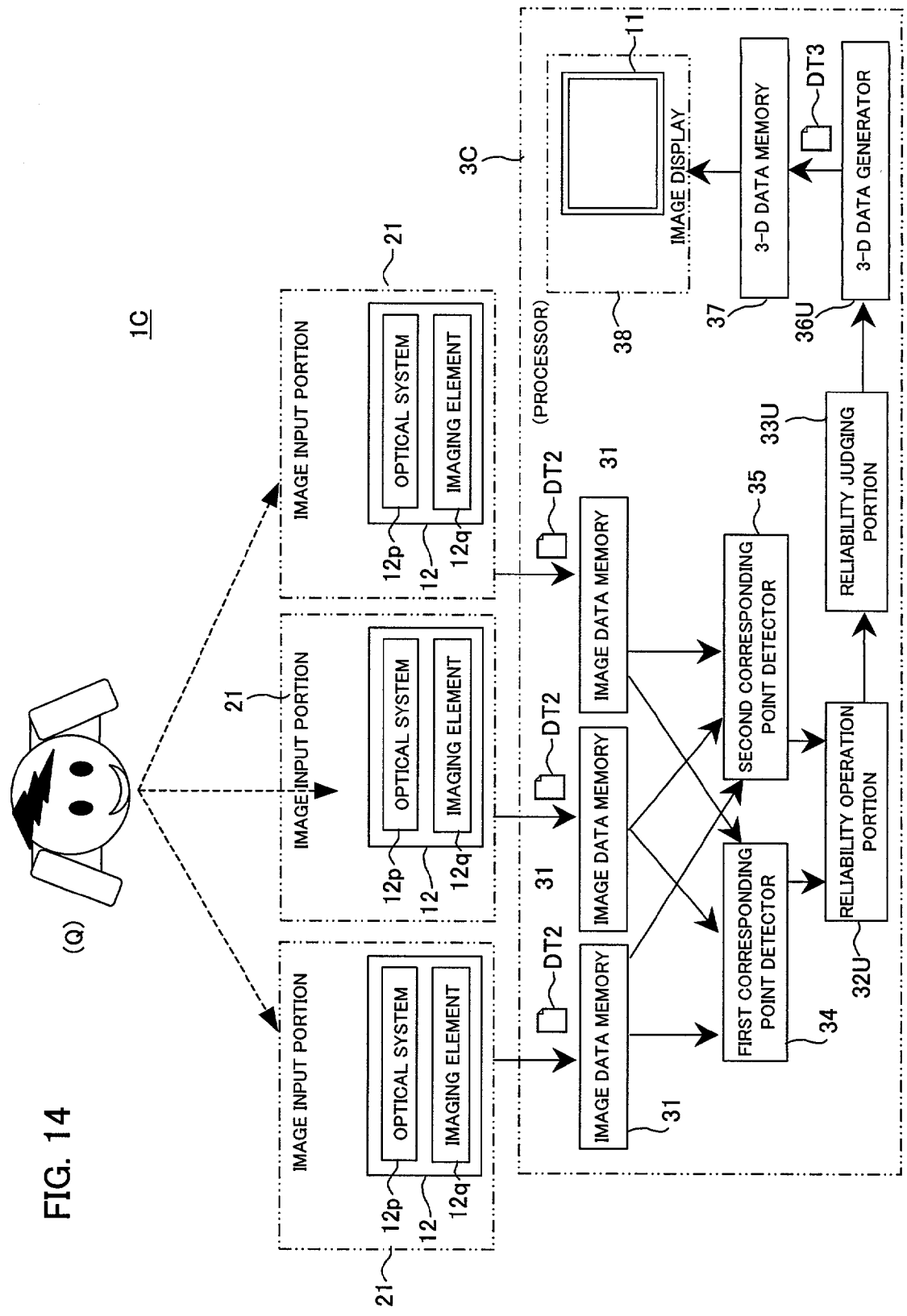
FIG. 14 is a block diagram showing constitution of the three-dimensional data generating apparatus 1C according to the third embodiment.

FIG. 13 shows an appearance of a three-dimensional data generating apparatus 1C according to the third embodiment. FIG. 14 is a block diagram showing a structure of the three-dimensional data generating apparatus 1C according to the third embodiment.

As shown in FIGS. 13 and 14, the three-dimensional image generating apparatus 1C comprises three image input portions 21 and a processor 3C. The image input portions operates in the same manner as those of the first embodiment.

The processor 3C is comprised of the same components as those of the first embodiment; however, the processor 3C is provided with three image data memories 31, a reliability operation portion 32U, a reliability judging portion 33U and a three-dimensional data generator 36U. Functions of the first corresponding point detector 34, the second corresponding point detector 35, the three-dimensional data memory 37, the image display 38 and the like are realized in the same manner as the first embodiment.

The reliability judging portion 33U compares a detection result obtained by the first corresponding point detector with a detection result obtained by the second corresponding point detector to judge which detection result is higher in reliability.

The three-dimensional data generator 36U performs three-dimensional reproduction based on the detection result higher in reliability based on the judgment result of the reliability judging portion 33U.

A method of obtaining reliability of the detection results will be described below with reference to a flowchart and drawings.

Figure 15:
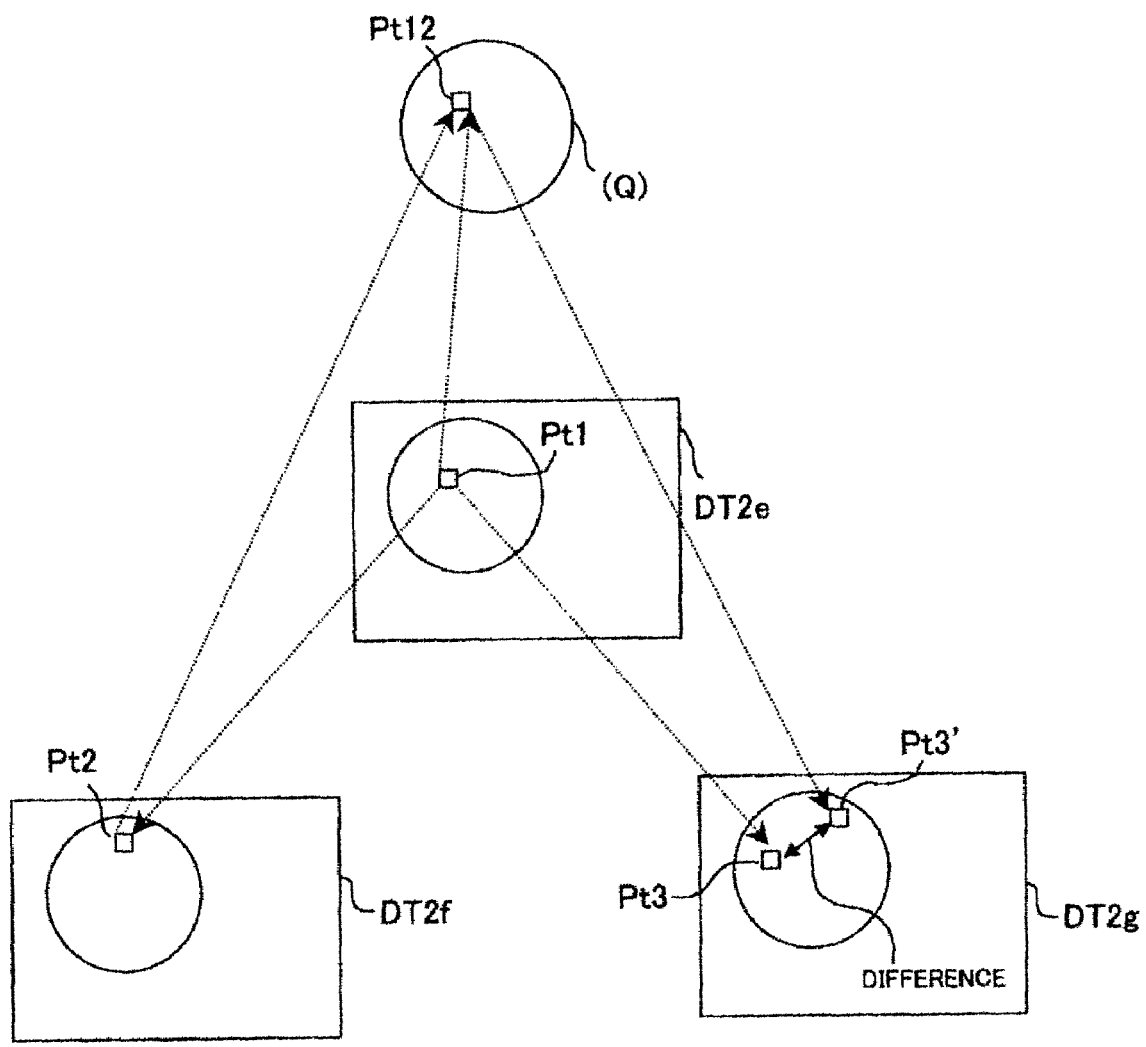
FIG. 15 illustrates the method of obtaining reliability of the detection results by way of an example.

FIG. 15 illustrates an example of the method of obtaining reliability of the detection results.

The image data DT2$e$, DT2$f$ and DT2$g$ are respectively generated by different image input portions. The point Pt1 is an arbitrary point included in the image data DT2$e$. The points Pt2 and Pt3 respectively are obtained by the first corresponding point detector and the second corresponding point detector as points on the image data DT2$f$ and DT2$g$ corresponding to the point Pt1. The point Pt12 is a point in a three-dimensional space obtained based on the points Pt1 and Pt2. The point Pt3' is a point obtained by projecting the point Pt12 on the image data DT2$g$.

Figure 16:
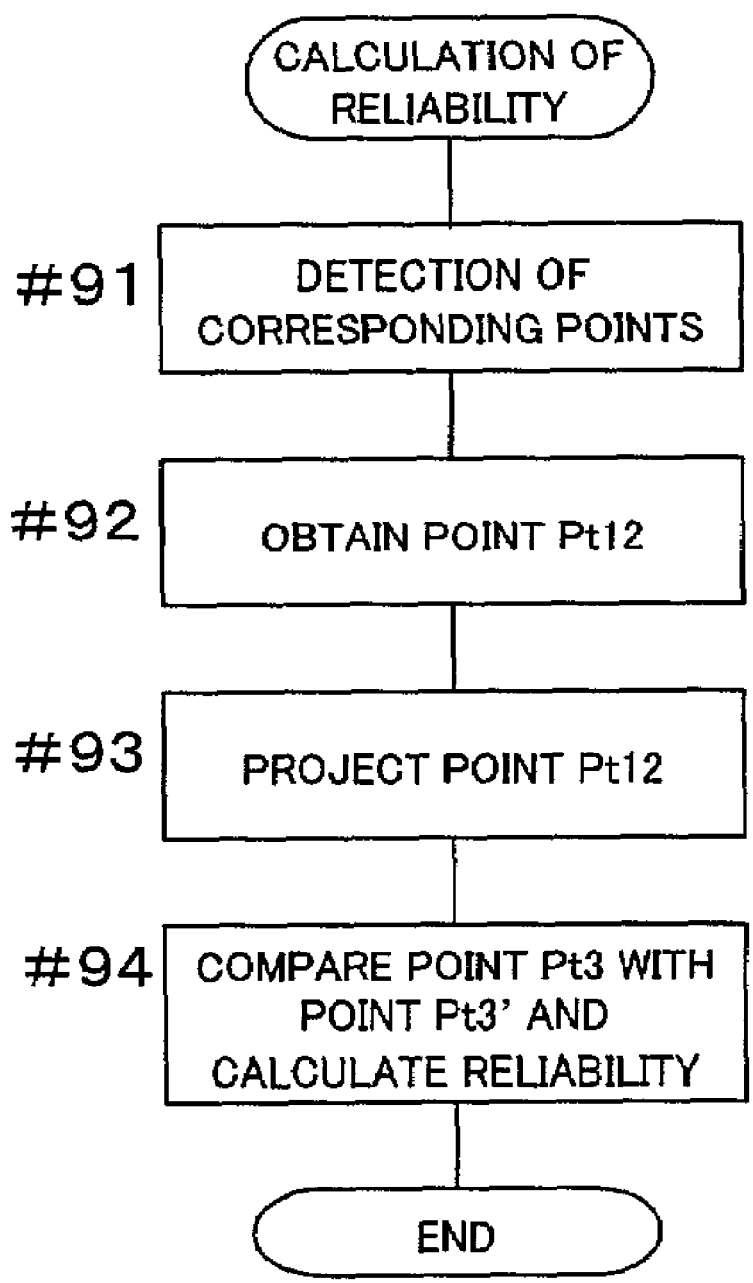
FIG. 16 is a flowchart showing a flow of processing for obtaining the reliability of the detection results.

FIG. 16 is a flowchart showing a flow of processing for obtaining the reliability of detection results.

In FIG. 16, there are obtained the points Pt2 and Pt3 that are on the image data DT2$f$ and DT2$g$, respectively, and correspond to the point Pt1 on the image data DT2$e$ (#91).

The point Pt12 on a three-dimensional coordinate is calculated based on the points Pt1 and Pt2 (#92). The point Pt12 is then projected onto the image data DT2$g$ to obtain Pt3' (#93). The points Pt3 and Pt3' are logically the same; however, in reality, the points Pt3 and Pt3' are different from each other due to calibration error or characteristics of the camera 12.

The difference between the point Pt3 and the point Pt3' is determined by comparison thereby to obtain reliability of the detection result (#94). Smaller the difference is, higher is the reliability.

Processing for generation of the three-dimensional data according to the third embodiment is described below with reference to a flowchart.

Figure 17:
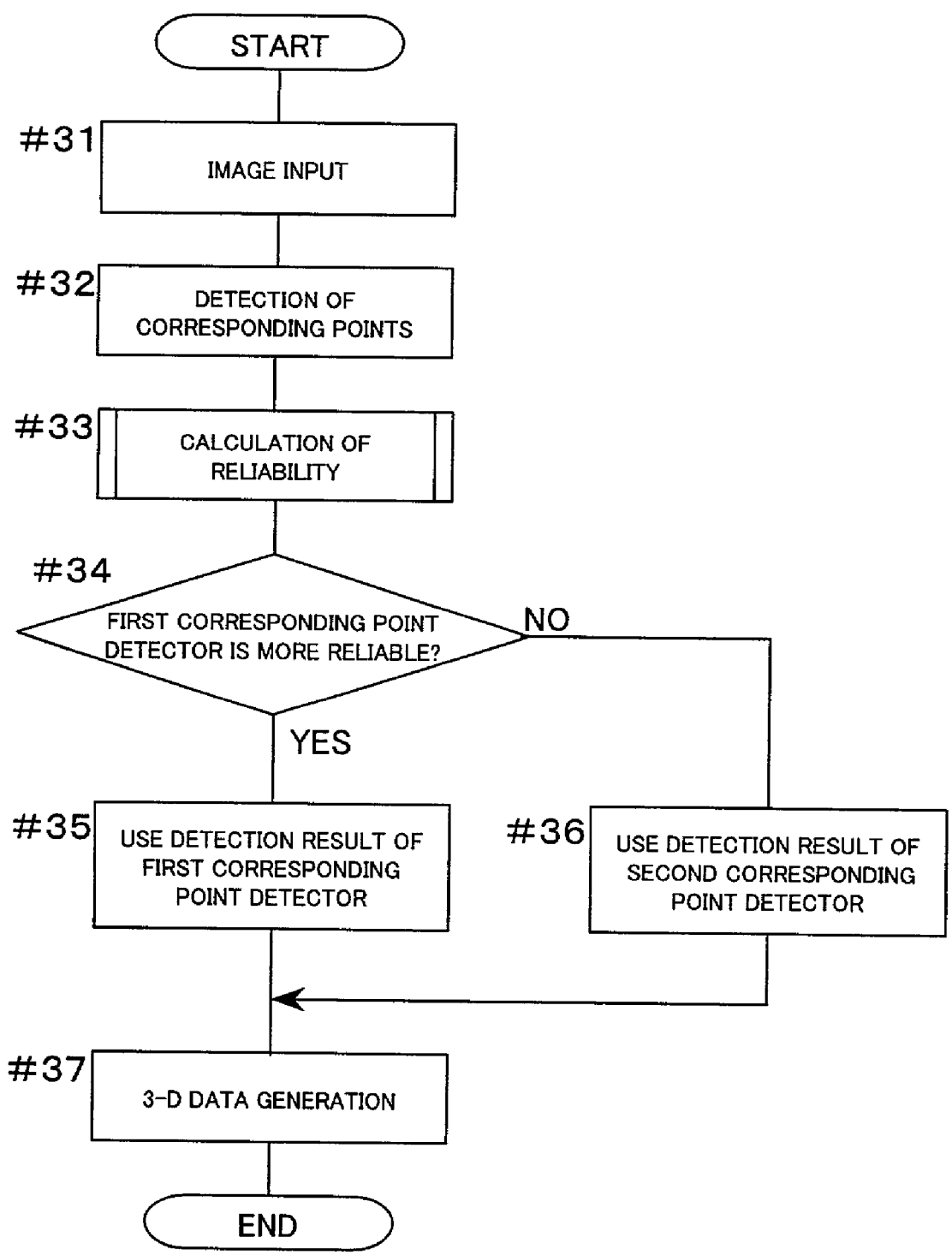
FIG. 17 is a flowchart showing a flow of processing for generating the three-dimensional data according to a third embodiment.

FIG. 17 is the flowchart showing a flow of the processing for generation of the three-dimensional data according to the third embodiment.

As shown in FIG. 17, three sets of image data are obtained by the three image input portions 21 (#31).

Detection of corresponding points are performed by the first corresponding point detector 34 and the second corresponding point detector 35 (#32), and reliability of the detection results are calculated (#33).

Based on the calculation results, it is judged which one of the detection result obtained by the first corresponding point detector 34 and the detection result obtained by the second corresponding point detector 35 is higher in the reliability (#34). Thus, the detection result higher in the reliability is selected (#35 and #36).

The three-dimensional data are generated based on the selected detection result (#37).

As described above, since the reliability of the detection result obtained by the first corresponding point detector 34 is compared with the reliability of the detection result obtained by the second corresponding point detector 35 and the three-dimensional data are generated based on the detection result higher in the reliability, it is possible to generate highly reliable three-dimensional data according to the third embodiment.

Further, the comparison of the reliability of the detection results is performed with respect to whole parts of the detection results in this embodiment; however, the comparison may be performed with dividing the detection results into partial areas.

For example, reliability of detection result of the first corresponding point detector 34 and reliability of detection result of the second corresponding point detector 35 are obtained with respect to a plurality of partial areas, and the reliabilities are compared to each other with respect to each of the partial areas to select the higher reliability with respect to each partial areas. Then, detection results higher in the reliability are so synthesized as to complete three-dimensional reproduction, thereby to generate the three-dimensional data.

Since the parts that are high in reliability are thus selected from the detection results obtained by both of the first corresponding point detector 34 and the second corresponding point detector 35, it is possible to generate three-dimensional data high in precision.

In the embodiments described above, parts corresponding to a background may be deleted from the image data in advance of the generation of three-dimensional data. Processing of the deletion of background may be carried out by various known methods. The deletion of background enables to eliminate redundant data and thus to reduce erroneous corresponding points.

Figure 18:
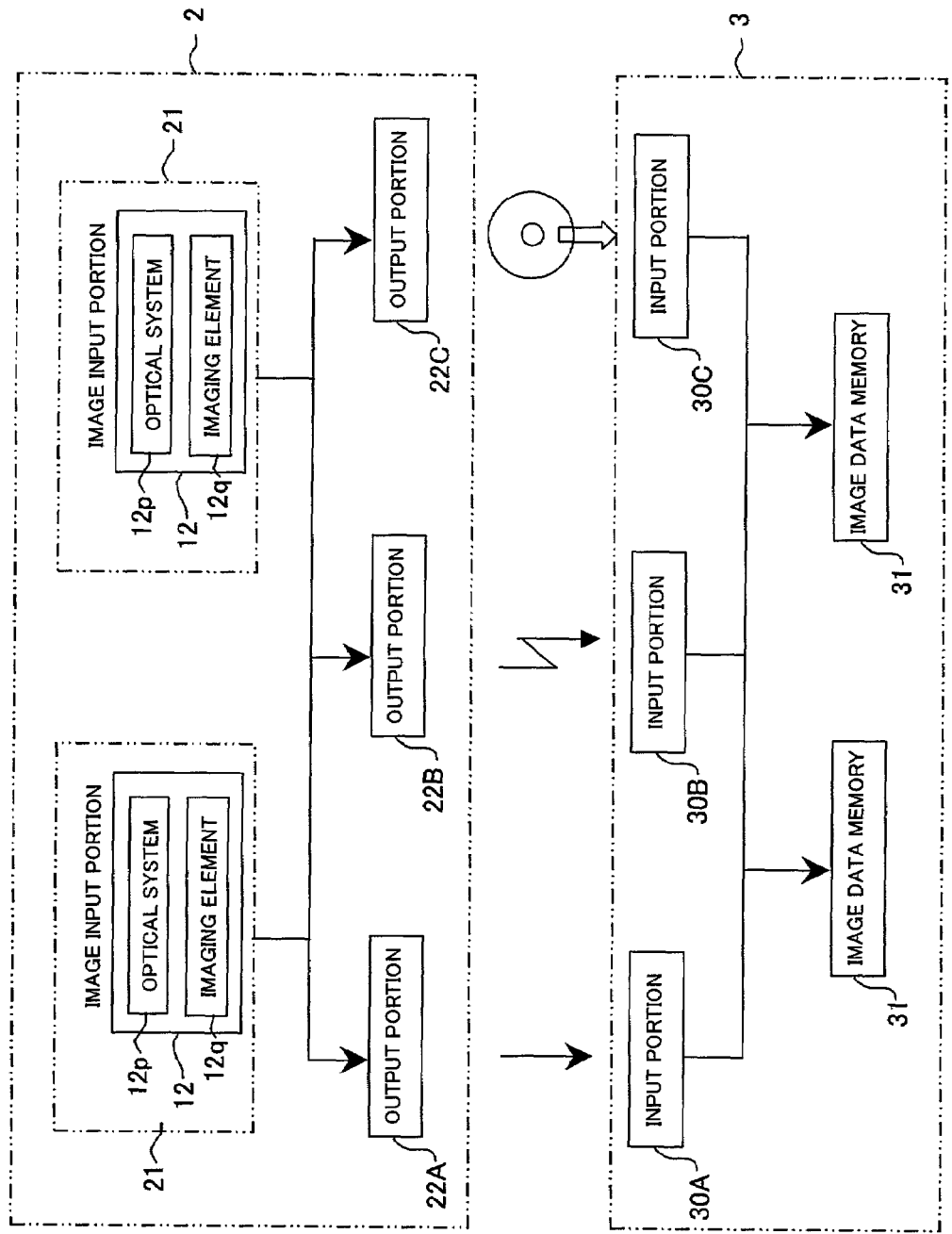
FIG. 18 shows a three-dimensional data generating apparatus as a modification.

In the embodiments described above, the image input portions 21 and the processor 3 are integrally comprised in the three-dimensional data generating apparatus 1, 1B and 1C; however, the image input portions and the processor 3 may be separately comprised in the three-dimensional data generating apparatus. FIG. 18 is a block diagram showing the modification of three-dimensional data generating apparatus. In this modification, a computer such as a personal computer is used for the processor 3. In FIG. 18, a multiple-lens camera 2 has a plurality of image input portions 21 and output portions 22A, 22B and 22C for outputting image signals obtained by the image input portions. Reference numeral 22A denotes a connection port for transferring the image signals to an external device via interface such as USB; reference numeral 22B denotes an output port for transferring the image signals to an external device via wireless communication such as infrared communication and reference numeral 22C denotes a driver for recording the image signals to a portable recording medium such as a memory card. In turn, a computer 3 is provided with input portions 30A, 30B and 30C that correspond respectively to the output portions 22A, 22B and 22C. The input portion 30A is a connection port for receiving signals from an external device via interface; the input portion 30B is an input port for receiving signals from an eternal device via wireless communication and the input portion 30C is a driver for reading data memorized in a portable recording medium. An image data memory 31 serves to receive the image signals input into the input portions and to store the same.

Thus, it is possible to improve configuration of the multiple-lens camera by reducing functions and devices required for multiple-lens camera as a result of performing burdensome processing such as the generation of three-dimensional data using a computer.

Whole or parts of structure of the three-dimensional data generating apparatus 1, 1B or 1C, number of components, contents of processings or orders of processings may be modified as required in the scope and spirits of the present invention.

According to the embodiments described above, it is possible to generate highly reliable three-dimensional irrelevant to the type of an object.

Further, according to the embodiments described above, it is possible to select a detector suitable for detecting a corresponding point of plural image data easily. Moreover, it is possible to select a highly reliable detection result of corresponding point to generate three-dimensional data of high precision.

What is claimed is:

1. A three-dimensional data generating apparatus, comprising:
    an obtaining portion for obtaining plural image data representing images obtained by photographing an object from different viewpoints, the plural image data each representing respective one of the images;
    a first detector for detecting corresponding points of the images by a gradient method;
    a second detector for detecting corresponding points of the images by a correlation method;
    a selector for selecting either one of the first detector or the second detector; and
    a generator for generating three-dimensional image of the object based on the corresponding points detected by the selected detector.

2. The three-dimensional data generating apparatus according to claim 1, further comprising:
    image data generators each of which generates image data by photographing an object, wherein
    the obtaining portion obtains the image data each generated by the respective image data generators.

3. The three-dimensional data generating apparatus according to claim 1, further comprising:
    an input portion for obtaining an image data from outside of the apparatus, wherein the obtaining portion obtains the image data from the input portion.

4. The three-dimensional data generating apparatus according to claim 1, further comprising:
    an object judging portion for judging a type of an object, wherein the selector selects either one of the first detector or the second detector based on the judgment result of the object judging portion.

5. The three-dimensional data generating apparatus according to claim 4, wherein
    the object judging portion judges whether or not the object is a human; and
    the selector selects either one of the first detector or the second detector in such a manner that the first detector is selected if it is judged that the object is a human and the second detector is selected if it is judged that the object is not a human.

6. The three-dimensional data generating apparatus according to claim 5, wherein
    the object judging portion detects colors of an object and judges that the object is a human if a predetermined amount of a predetermined color is contained in the object.

7. The three-dimensional data generating apparatus according to claim 1, further comprising:
    a luminance gradient calculation portion for calculating a luminance gradient of an object, wherein
    the selector selects either one of the first detector or the second detector in such a manner that the first detector is selected if the calculated luminance is lower than a predetermined value and the second detector is selected if the calculated luminance gradient is higher than the predetermined value.

8. The three-dimensional data generating apparatus according to claim 1, further comprising:
an appointing portion for appointing either one of the detectors, wherein
the selector selects either one of the first detector or the second detector based on the appointment by the appointing portion.

9. A three-dimensional data generating apparatus, comprising:
an obtaining portion for obtaining plural image data representing images obtained by capturing an object from different viewpoints, the image data each representing respective one of the images;
a first detector for detecting corresponding points of the images by a gradient method;
a second detector for detecting corresponding points of the images by a correlation method;
a precision operation portion for operating a precision of the detection of the corresponding points carried out by the first detector based on the corresponding points and a precision of detection of the corresponding points carried out by the second detector based on the corresponding points;
a decision portion for deciding to use either one of the corresponding points detected by the first detector or the corresponding points detected by the second detector based on the precision obtained by the precision operation portion; and
a generator for generating a three-dimensional data of the object based on the corresponding points decided by the decision portion.

10. The three-dimensional data generating apparatus according to claim 9, further comprising:
a first image data generator, a second image data generator and a third image data generator, each of which generating image data by photographing an object, wherein
the precision operation portion operates the precision of the detection by obtaining a point corresponding to a reference point in the image data generated by the first image data generator in each of the image data generated by the second and the third image data generators and comparing one of the corresponding—points with the other.

11. A three-dimensional data generating method, comprising the steps of:
obtaining as plural image data plural images respectively obtained by photographing an object from different angles;
selecting either one of a gradient method or a correlation method;
generating three-dimensional data of the object based on corresponding points obtained by the selected method, the corresponding points being a pair of points indicating an identical part of the object in the plural images.

12. The three-dimensional data generating method according to claim 11, wherein
either one of the gradient method or the correlation method is selected based on the plural images.

13. The three-dimensional data generating method according to claim 12, wherein
either one of the gradient method or the correlation method is selected based on luminance of the plural images.

14. The three-dimensional data generating method according to claim 13, wherein
either one of the gradient method or the correlation method is selected based on color composition of the plural images.

15. The three-dimensional data generating apparatus according to claim 11, wherein
either one of the gradient method or the correlation method is selected based on a comparison of reliabilities of the corresponding points obtained by the gradient method with reliabilities of the corresponding points obtained by the correlation method.

* * * * *